United States Patent
Takarabe et al.

(10) Patent No.: US 10,641,323 B2
(45) Date of Patent: May 5, 2020

(54) BEARING DEVICE

(71) Applicant: JTEKT CORPORATION, Osaka-shi, Osaka (JP)

(72) Inventors: Masatsugu Takarabe, Kashiwara (JP); Yoshiyuki Ina, Osaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/065,426

(22) PCT Filed: Dec. 22, 2016

(86) PCT No.: PCT/JP2016/088297
§ 371 (c)(1),
(2) Date: Jun. 22, 2018

(87) PCT Pub. No.: WO2017/110978
PCT Pub. Date: Jun. 29, 2017

(65) Prior Publication Data
US 2019/0024711 A1 Jan. 24, 2019

(30) Foreign Application Priority Data
Dec. 25, 2015 (JP) ................................. 2015-253053

(51) Int. Cl.
*F16C 19/38* (2006.01)
*F16C 33/60* (2006.01)
(Continued)

(52) U.S. Cl.
CPC .......... *F16C 19/386* (2013.01); *F16C 19/543* (2013.01); *F16C 33/60* (2013.01); *F16C 43/04* (2013.01); *F16C 2326/02* (2013.01)

(58) Field of Classification Search
CPC .............. F16C 2226/50; F16C 2226/70; F16C 2226/74; F16C 2226/76; F16C 2226/78;
(Continued)

(56) References Cited

U.S. PATENT DOCUMENTS 1,379,945 A * 5/1921 Teetsow ................ F16C 19/163
16/DIG. 27
1,908,474 A * 5/1933 Dewees .................. F16C 19/54
384/501
(Continued)

FOREIGN PATENT DOCUMENTS

CN 105065447 A 11/2015
DE 102010017964 A1 10/2011
(Continued)

OTHER PUBLICATIONS

Machine Translation of JP-2004360723-A (Year: 2004).*
(Continued)

*Primary Examiner* — Alan B Waits
(74) *Attorney, Agent, or Firm* — Oliff PLC

(57) ABSTRACT

A bearing device includes a first outer ring member and a second outer ring member which include a raceway surface in each inner circumferential surface and are disposed to abut on each other in an axial direction, a coupling ring which fixes the first outer ring member and the second outer ring member to each other, an inner ring in which two rows of raceway surfaces are formed in an outer circumferential surface, and a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring.

11 Claims, 11 Drawing Sheets

(51) Int. Cl.
*F16C 43/04* (2006.01)
*F16C 19/54* (2006.01)

(58) Field of Classification Search
CPC .......... F16C 19/385–386; F16C 19/543; F16C 2326/02; F16C 43/04; F16C 33/60
See application file for complete search history.

(56) References Cited

U.S. PATENT DOCUMENTS

| | | | | |
|---|---|---|---|---|
| 2,075,280 | A * | 3/1937 | Green | F16C 19/184 384/504 |
| 3,733,109 | A * | 5/1973 | Hallerback | F16C 33/605 384/564 |
| 4,749,288 | A * | 6/1988 | Tilch | F16C 19/386 384/584 |
| 4,783,182 | A * | 11/1988 | Caron | F16C 19/183 384/504 |
| 5,129,742 | A * | 7/1992 | Tilch | B60T 8/171 324/173 |
| 5,641,239 | A * | 6/1997 | Michalek | F16C 33/60 384/499 |
| 5,651,617 | A * | 7/1997 | Danielsson | B60B 27/001 384/539 |
| 2006/0029314 | A1* | 2/2006 | Pete | F16C 19/386 384/477 |
| 2009/0016659 | A1* | 1/2009 | Ansorge | F16C 19/385 384/461 |
| 2009/0123099 | A1* | 5/2009 | Dickerhoff | B61F 15/22 384/459 |
| 2009/0245706 | A1* | 10/2009 | Morishita | F16C 33/3806 384/492 |
| 2010/0142875 | A1* | 6/2010 | Mori | F16C 33/6614 384/572 |
| 2011/0030219 | A1* | 2/2011 | Matsui | C21D 9/38 29/898 |
| 2011/0243488 | A1* | 10/2011 | Kizawa | C21D 1/06 384/569 |
| 2014/0363114 | A1* | 12/2014 | Katsaros | F16C 33/6648 384/469 |

FOREIGN PATENT DOCUMENTS

| | | | |
|---|---|---|---|
| JP | S50-60457 U | 6/1975 | |
| JP | S57-024988 Y2 | 5/1982 | |
| JP | S62-158216 U | 10/1987 | |
| JP | 2001140868 A * | 5/2001 | ............. F16C 19/54 |
| JP | 2004360723 A * | 12/2004 | |
| JP | 2005-214330 A | 8/2005 | |
| JP | 2006-095629 A | 4/2006 | |
| JP | 2006-312955 A | 11/2006 | |
| JP | 2011-027130 A | 2/2011 | |

OTHER PUBLICATIONS

Mar. 14, 2017 International Search Report issued in International Patent Application No. PCT/JP2016/088297.
Mar. 14, 2017 Written Opinion issued in International Patent Application No. PCT/JP2016/088297.
Jul. 15, 2019 Office Action issued in Chinese Patent Application No. 201680076159.9.

* cited by examiner

BEARING DEVICE

TECHNICAL FIELD

Embodiments of the present invention relate to a bearing device, and particularly to a bearing device which is used in a wheel of a vehicle such as a truck.

BACKGROUND ART

A taper hub unit is used in a vehicle having a vehicle body of a frame structure such as a truck, and a bearing device used in the taper hub unit includes an outer ring, an inner ring, a plurality of roller rolling elements, and a cage. The outer ring and the inner ring have two rows of raceway surfaces. The roller rolling elements are disposed in two rows so as to roll in two rows of raceway surfaces (the outer ring and the inner ring). The cage holds the plurality of roller rolling elements in a space interposed between the raceway surface of the outer ring and the raceway surface of the inner ring.

By the way, an outer ring in a bearing device having a plurality of bearing rings has been formed by a plurality of members.

Patent Literature 1 discloses a bearing device in which rolling elements are disposed in two rows. As illustrated in FIG. 16, in a bearing device 901, an outer ring 902 includes a pair of outer ring members 903 and 904 having a single row of groove. The pair of outer ring members 903 and 904 are fixed on an inner circumferential surface of each outer ring member so as not to be separated by an annular resin coupling ring 909.

CITATION LIST

Patent Literature

[Patent Literature 1]: DE-A-102010017964

SUMMARY OF THE INVENTION

Technical Problem

By the way, in the case of fixing the inner circumferential surfaces of the outer ring members to each other with the coupling ring, it is necessary to press-fit the coupling ring into the outer ring members, so that a high degree of accuracy is required for the dimension of the inner diameter of the outer ring member and the dimension of the outer circumferential surface of the coupling ring. The reason is because there is a possibility that, when the dimension of the inner dimension of the outer ring member is too large in size with respect to the dimension of the outer circumferential surface of the coupling ring, the coupling of the outer ring members becomes defective. In addition, the reason is because there is a possibility that, when the dimension of the inner dimension of the outer ring member is too small in size with respect to the dimension of the outer circumferential surface of the coupling ring, a load due to the press fitting is applied to the coupling ring more than necessary in the case where the coupling member is attached to the outer ring members, shavings of the coupling ring are generated, or the coupling ring is deteriorated.

Therefore, in the case of attaching the coupling ring to the inner circumferential surface of the outer ring member, it is necessary to perform a polishing process in addition to a cutting process on a portion of the outer ring member fitted with the coupling ring. Thus, the manufacturing process of the outer ring member is complicated.

The invention has been made in view of the problems, and an object of the invention is to provide a bearing device in which outer ring members are coupled to a coupling ring without polishing a portion of the outer ring members which is fitted with the coupling ring.

Solution to Problem

In order to solve the above problem, a first aspect of the present invention is to provide a bearing device including: a first outer ring member and a second outer ring member which include a raceway surface in each inner circumferential surface and are disposed to abut on each other in an axial direction; a coupling ring which fixes the first outer ring member and the second outer ring member to each other; an inner ring in which two rows of raceway surfaces are formed in an outer circumferential surface; and a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring. The first outer ring member includes a first groove extending in a circumferential direction in an outer circumferential surface, and a first projection which is annularly formed to protrude outwards in a radial direction at a position closer to the second outer ring member than the first groove. The second outer ring member includes a second groove extending in the circumferential direction in an outer circumferential surface, and a second projection which is annularly formed to protrude outwards in the radial direction at a position closer to the first outer ring member than the second groove. The coupling ring includes a first claw which protrudes toward the first groove, and a second claw which protrudes toward the second groove. A surface forming the first projection of the first outer ring member and a surface forming the second projection of the second outer ring member do not include a polishing surface.

Advantageous Effects of the Invention

According to the first aspect, it is possible to provide the bearing device in which the outer ring members are coupled to the coupling ring without polishing the portion of outer ring members which is fitted with the coupling ring.

DESCRIPTION OF EMBODIMENTS

Figure 1:
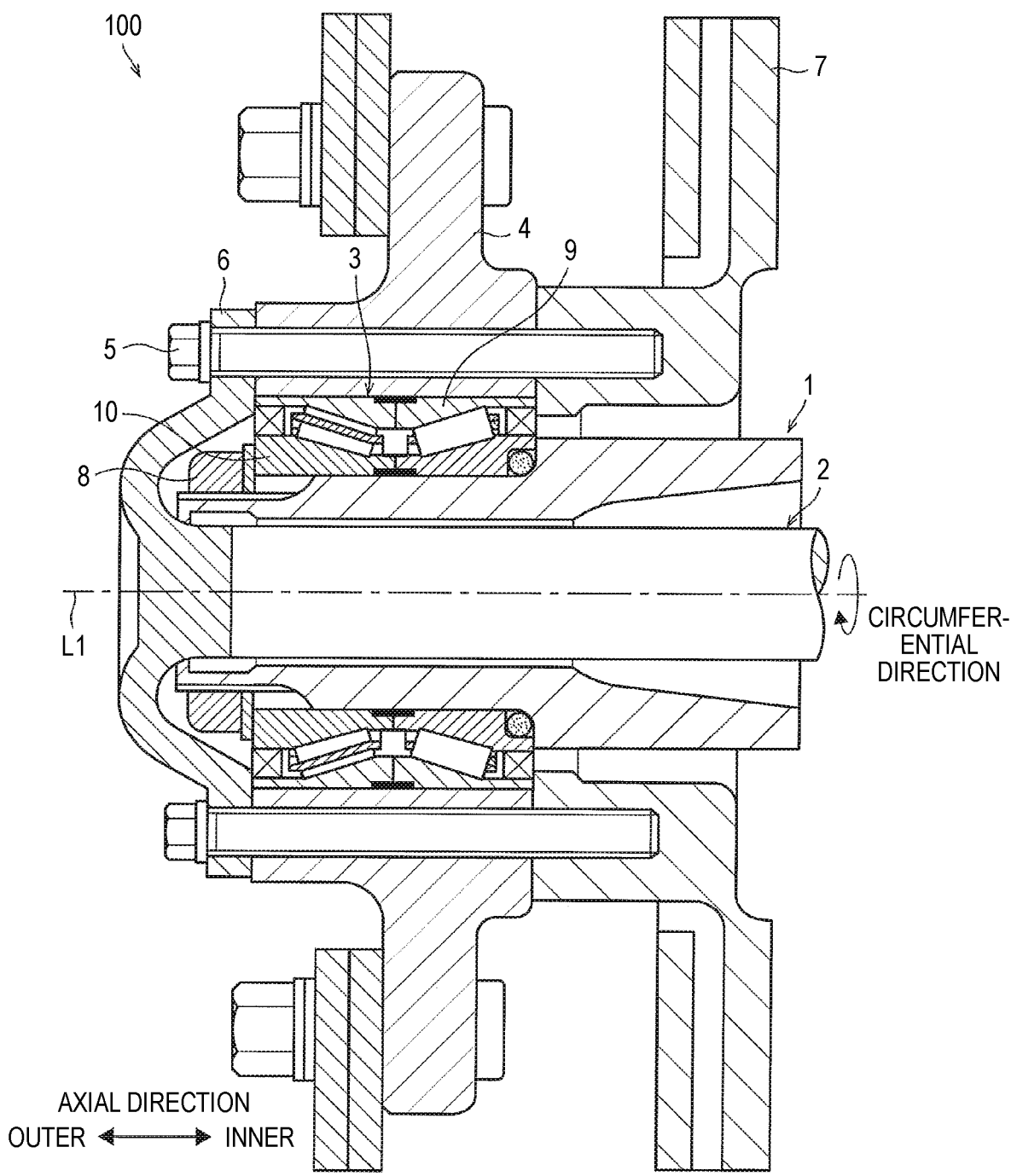
FIG. 1 is a cross-sectional view of a hub unit.

In order to solve the above problem, a bearing device of the present invention includes: a first outer ring member and a second outer ring member which include a raceway surface in each inner circumferential surface and are disposed to abut on each other in an axial direction; a coupling ring which fixes the first outer ring member and the second outer ring member to each other; an inner ring in which two rows of raceway surfaces are formed in an outer circumferential surface; and a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring. The first outer ring member includes a first groove extending in a circumferential direction in an outer circumferential surface, and a first projection which is annularly formed to protrude outwards in a radial direction at a position closer to the second outer ring member than the first groove. The second outer ring member includes a second groove extending in the circumferential direction in an outer circumferential surface, and a second projection which is annularly formed to protrude outwards in the radial direction at a position closer to the first outer ring member than the second groove. The coupling ring includes a first claw which protrudes toward the first groove, and a second claw which protrudes toward the second groove. A surface forming the first projection of the first outer ring member and a surface forming the second projection of the second outer ring member do not include a polishing surface.

In the bearing device according to the present invention, preferably, a portion, which is closest to an axial center in at least the radial direction, of end surfaces facing an outer side in the axial direction in the surface forming the first claw is an inclined surface whose diameter becomes larger from a center portion toward the outer side in the axial direction, and a portion, which is closest to the axial center in at least the radial direction, of end surfaces facing an outer side in the axial direction in the surface forming the second claw is an inclined surface whose diameter becomes larger from a center portion toward the outer side in the axial direction.

In the bearing device according to the present invention, preferably, a portion, which is farthest to the axial center in at least the radial direction, of end surfaces facing the center portion in the axial direction in the surface forming the first projection is an inclined surface whose diameter becomes larger from the center portion toward the outer side in the axial direction, and a portion, which is farthest to the axial center in at least the radial direction, of end surfaces facing the center portion in the axial direction in the surface forming the second projection is an inclined surface whose diameter becomes larger from the center portion toward the outer side in the axial direction.

In the bearing device according to the present invention, preferably, a distance in the radial direction between the inner circumferential surface of the coupling ring and the surface of the first projection facing the outer side in the radial direction is smaller than a thickness of a clearance formed between the first groove and the first claw, and a distance in the radial direction between the inner circumferential surface of the coupling ring and the surface of the second projection facing the outer side in the radial direction is smaller than a thickness of a clearance formed between the second groove and the second claw.

Hereinafter, the present invention will be described in detail by way of preferred embodiments. It should be noted that the present invention is not limited to the following embodiments. For convenience of explanation, each of the drawings that are to be referred to in the following description schematically shows only the main members required to describe the present invention, among the constituent members of the embodiments of the present invention. Therefore, the present invention can include any constituent members that are not shown in the following drawings. The size of and size ratio of each of the members in the following drawings do not exactly reflect those of the actual constituent members.

First Embodiment

Embodiments of the present invention will be described with reference to the drawings.

FIG. 1 illustrates a hub unit 100 according to this embodiment. FIG. 1 is a cross-sectional view taken along an axial center L1 of the hub unit 100. The hub unit 100 is used in, for example, a wheel of a vehicle such as a truck.

The hub unit 100 includes an axle pipe 1, a driving shaft 2, a tapered roller bearing 3, a wheel hub 4, a hub bolt 5, a flange 6, a brake rotor 7, and a fixing nut 8. The axle pipe 1 is coupled to a differential (not illustrated). The driving shaft 2 is inserted in the axle pipe 1. The tapered roller bearing 3 is mounted in an outer circumferential surface of the axle pipe 1. The tapered roller bearing 3 is a bearing where rolling elements are disposed in double rows (two rows in this embodiment). The tapered roller bearing 3 of this embodiment corresponds to the bearing device of the invention.

The wheel hub 4 is fitted to an outer circumferential surface of the tapered roller bearing 3. With this configuration, the wheel hub 4 becomes rotatable to the axle pipe 1. The wheel hub 4 is coupled to the flange 6 of the driving shaft 2 through the hub bolt 5. The hub bolt 5 couples the flange 6, the wheel hub 4, and the brake rotor 7.

As described above, the tapered roller bearing 3 is fitted to the inner circumferential surface of the wheel hub 4, and fitted to the outer circumferential surface of the end on the outer side of the axle pipe 1. In other words, an outer ring 9 (to be described below) of the tapered roller bearing 3 rotates integrally to the wheel hub 4. An inner ring 10 of the tapered roller bearing 3 rotates integrally to the axle pipe 1. The tapered roller bearing 3 is fastened and fixed by the fixing nut 8 not to be loosed in the axial direction.

Figure 2:
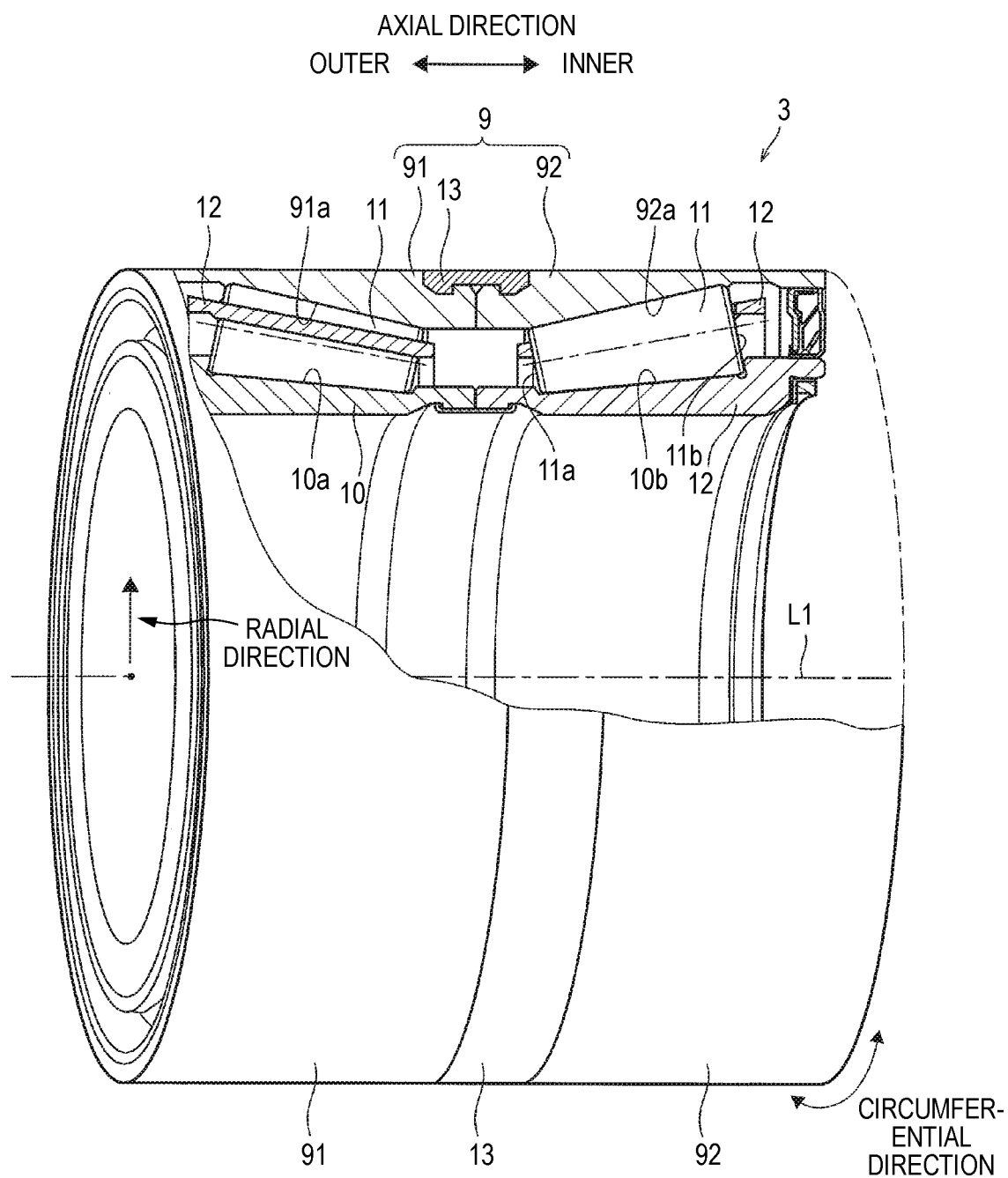
FIG. 2 is a perspective view partially illustrating a cross section of a tapered roller bearing.

FIG. 2 is a perspective view of the tapered roller bearing 3. In the perspective view of FIG. 2, a cross section taken along the plane containing the axial center L1 is illustrated. The tapered roller bearing 3 includes a pair of outer rings 9, the inner ring 10, a plurality of rolling elements 11, and a cage 12.

The outer ring 9 is formed of a pair of outer ring members. The pair of outer ring members will be called a first outer ring member 91 and a second outer ring member 92 respectively. Each of the first outer ring member 91 and the second outer ring member 92 is formed almost in a cylindrical shape. The first outer ring member 91 and the second outer ring member 92 have the same inner diameter and the same outer diameter. One bottom of the first outer ring member 91 and one bottom of the second outer ring member 92 are fixed to each other, and form the outer ring 9 of almost the cylindrical shape as a whole. A fixing configuration of the first outer ring member 91 and the second outer ring member 92 will be described below.

A raceway surface, on which the rolling element 11 rolls, is formed in the inner circumferential surface of the pair of the first outer ring member 91 and the second outer ring member 92. The raceway surface formed in the first outer ring member 91 is called a first raceway surface 91a, and the raceway surface formed in the second outer ring member 92 is called a second raceway surface 92a.

A portion of the first raceway surface 91a closer axially to the second raceway surface 92a is formed to have a small diameter from the axial center L1 compared to a portion of the first raceway surface 91a distant axially from the second raceway surface 92a. Similarly, a portion of the second raceway surface 92a closer axially to the first raceway surface 91a is formed to have a small diameter from the axial center L1 compared to a portion of the second raceway surface 92a distant axially from the first raceway surface 91a. With this configuration, over the entire outer ring 91, thicknesses in the radial direction at both axial ends are formed thinner than a thickness in the radial direction in the axial center portion. In a cross section containing the axial center L1, the first raceway surface 91a is inclined in a straight shape from the axial center portion of the outer ring 9 toward the end. The second raceway surface 92a is inclined in a straight shape from the axial center portion of the outer ring 9 toward the end.

The inner ring 10 is disposed to be fitted into the outer ring 9. Two rows of raceway surfaces are formed in an outer circumferential surface of the inner ring 10 to be separated from each other in the axial direction. The two rows of raceway surfaces formed in the outer circumferential surface of the inner ring 10 are called a first raceway surface 10a and a second raceway surface 10b. The first raceway surface 10a and the second raceway surface 10b are formed to correspond to the first raceway surface 91a and the second raceway surface 92a of the outer ring 9 respectively. The inner ring 10 may be formed of a pair of inner ring members as illustrated in FIG. 2, or may be formed of a single member.

A portion of the first raceway surface 10a closer axially to the second raceway surface 10b is formed to have a small diameter from the axial center L1 compared to a portion of the first raceway surface 10a distant axially from the second raceway surface 10b. Similarly, a portion of the second raceway surface 10b closer axially to the first raceway surface 10a is formed to have a small diameter from the axial center L1 compared to a portion of the second raceway surface 10b distant axially from the first raceway surface 10a. With this configuration, over the entire inner ring 10, thicknesses in the radial direction at both axial ends are formed thicker than a thickness in the radial direction in the axial center portion. In a cross section containing the axial center L1, the first raceway surface 10a is inclined in a straight shape from the axial center portion of the inner ring 10 toward the end. The second raceway surface 10b is inclined in a straight shape from the axial center portion of the inner ring 10 toward the end.

The inclination angle of the first raceway surface 10a of the inner ring is smaller than that of the first raceway surface 91a of the outer ring. The inclination angle of the second raceway surface 10b of the inner ring is smaller than that of the second raceway surface 92a of the outer ring. With this configuration, the space (raceway) formed between the first raceway surfaces 91a and 10a and the space (raceway) formed between the second raceway surfaces 92a and 10b in the space formed between the outer ring 9 and the inner ring 10 are formed to be large in the radial direction from the axial center portion toward both ends.

Each of the plurality of rolling elements 11 is a tapered roller rolling element. Each of the plurality of rolling elements 11 is a truncated cone shape which has a small-diameter bottom 11a and a large-diameter bottom 11b. The plurality of rolling elements 11 are disposed in a space (raceway) formed between the inner circumferential surface of the outer ring 9 and the outer circumferential surface of the inner ring 10. Specifically, one disposed on the outer side among the plurality of rolling elements 11 is disposed between the first raceway surface 91a of the outer ring 9 and the first raceway surface 10a of the inner ring, and comes into contact with the first raceway surface 91a and the first raceway surface 10a. One disposed on the inner side among the plurality of rolling elements 11 is disposed between the second raceway surface 92a of the outer ring 9 and the second raceway surface 10b of the inner ring, and comes into contact with the second raceway surface 92a and the second raceway surface 10b. The rolling element 11 disposed between the first raceway surface 91a and the first raceway surface 10a is disposed such that the small-diameter bottom 11a of the rolling element 11 is disposed in the portion near the center in the axial direction in the first raceway surfaces 91a and 10a. The rolling element 11 disposed between the second raceway surface 92a and the second raceway surface 10b is disposed such that the small-diameter bottom 11a of the rolling element 11 is disposed in the portion near the center in the axial direction in the second raceway surfaces 92a and 10b.

The cage 12 is disposed in a space formed of the inner circumferential surface of the outer ring 9 and the outer circumferential surface of the inner ring 10. The cage 12 holds the plurality of rolling elements 11 such that the plurality of rolling elements 11 are disposed as described above.

The first outer ring member 91 and the second outer ring member 92 are fixed to each other to form the outer ring 9 as described above. The first outer ring member 91 and the second outer ring member 92 are coupled by a coupling ring 13. The coupling ring 13 couples the first outer ring member 91 and the second outer ring member 92 in the outer circumferential surfaces of both members as illustrated in FIG. 2.

(Coupling Ring)

Figure 3:
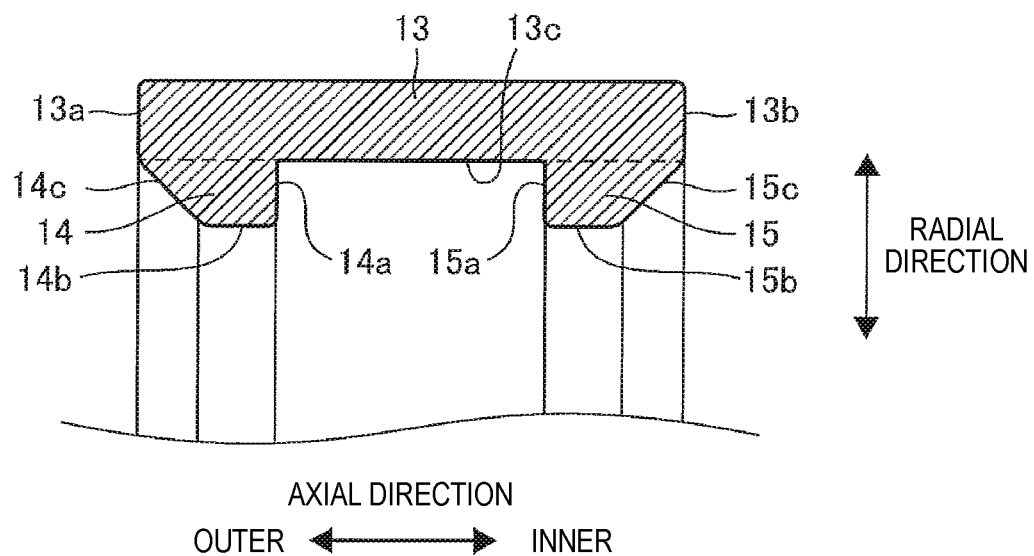
FIG. 3 is a cross-sectional view of a coupling ring according to a first embodiment.

FIG. 3 is a cross-sectional view of the coupling ring 13. The coupling ring 13 is formed in an annular shape. Both ends of the coupling ring 13 in the axial direction protrude inward in the radial direction to form claws 14 and 15. Each of the claws 14 and 15 annularly extends over the entire circumference of the coupling ring 13.

An end surface on the outer side of the coupling ring 13 is a surface 13a. As illustrated in FIG. 3, the claw 14 protrudes inward in the radial direction from the end on the outer side of the coupling ring 13. The claw 14 includes a surface 14a, a surface 14b, and a surface 14c.

In addition, an end surface on the inner side of the coupling ring 13 is a surface 13b. As illustrated in FIG. 3, the claw 15 protrudes inward in the radial direction from a portion of the inner circumferential surface 13c being in contact with the surface 13b. The claw 15 includes a surface 15a, a surface 15b, and a surface 15c.

The surface 14a and the surface 15a are annular surfaces which are substantially parallel to each other in the radial direction. Surfaces constituted by the surface 14a and the surface 15a are engaged with the first outer ring member 91 and the second outer ring member 92, respectively.

The surface 14b is substantially parallel to the axial center. Further, the surface 15b is substantially parallel to the axial center. The surface 14b and the surface 15b form a cylindrical surface as a whole.

The surface 14c forms an end surface of the claw 14 that faces outward in the axial direction (outer side). The surface 14c is inclined with respect to both the axial direction and the radial direction. In addition, the surface 15c forms an end surface of the claw 15 that faces outward in the axial direction (inner side). The surface 15c is inclined with respect to both the axial direction and the radial direction. The surface 14c and the surface 15c form a surface, which has a truncated cone shape in side view, as a whole.

The coupling ring 13 is made of a resin. As a resin for forming the coupling ring 13, for example, PA66 (6, 6-nylon) and PA46 (4, 6-nylon) may be used.

The coupling ring 13 can be formed by, for example, injection molding of a resin. At this time, the claws 14 and 15 facing each other in the axial direction can be formed by slide mold machining. Alternatively, in a state where the resin is filled between the claws 14 and 15 facing each other in the axial direction, additional work is performed in addition to the injection molding to remove the resin filled between the claws 14 and 15 and to obtain the coupling ring 13.

(First Outer Ring Member)

Figure 4:
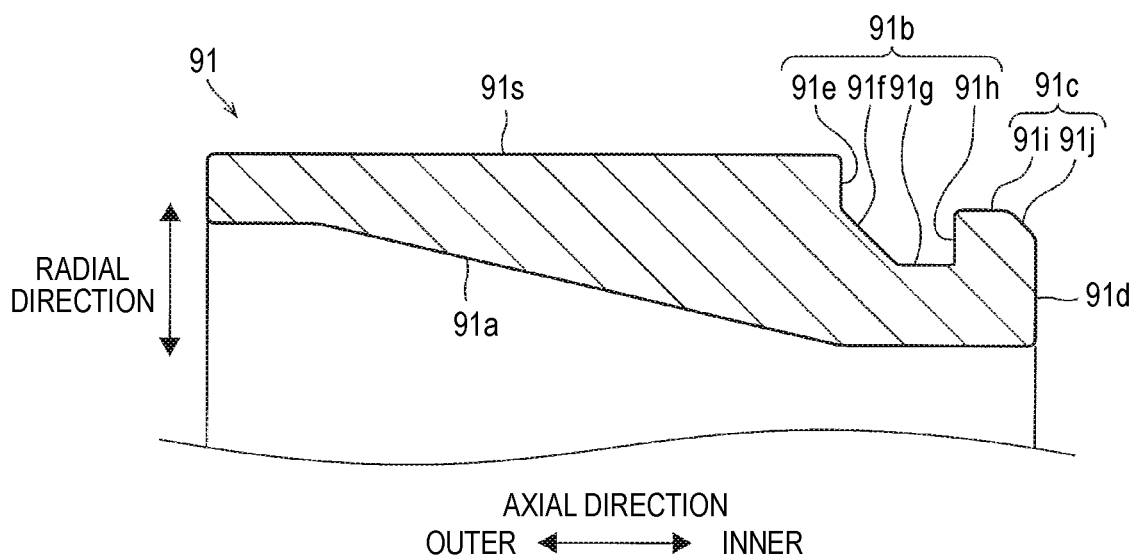
FIG. 4 is a cross-sectional view of a first outer ring member according to the first embodiment.

FIG. 4 is a cross-sectional view of the first outer ring member 91. A groove 91b is formed on the inner side of the outer circumferential surface 91s of the first outer ring member 91. The groove 91b extends annularly in a circumferential direction. The groove 91b is formed in the axial direction with a distance of about 0.2 to 2 cm from the surface 91d where the first outer ring member 91 is in contact with the second outer ring member 92.

The inner side of the first outer ring member 91 is provided with a projection 91c rather than the groove 91b. The projection 91c protrudes outward in the radial direction from the groove 91b in the cross-sectional view illustrated in FIG. 4.

The groove 91b includes a surface 91e, a surface 91f, a surface 91g, and a surface 91h. In addition, the projection 91c includes a surface 91i and a surface 91j. The surface 91i and the surface 91j of the projection 91c form an end surface facing an axial center portion.

The surface 91e is continuous with the outer circumferential surface 91s. The surface 91e is an annular surface that is substantially parallel to the radial direction.

The surface 91f is formed continuously with the surface 91e on the inner side of the surface 91e. The surface 91f is inclined with respect to the axial direction. Further, the surface 91f is also inclined with respect to the radial direction. The surface 91f forms a surface, which has a truncated cone shape in side view whose diameter increases from the inner side to the outer side, as a whole.

The surface 91g is formed continuously with the surface 91f on the inner side of the surface 91f. The surface 91g is substantially parallel to the axial direction. The surface 91g forms a cylindrical surface as a whole.

The surface 91h is formed continuously with the surface 91g on the inner side of the surface 91g. The surface 91h is continuous with the projection 91c. The surface 91h is an annular surface that is substantially parallel to the radial direction. The surface 91h is engaged with the surface 14a of the claw 14.

The surface 91i is continuous with the surface 91h of the groove 91b. The surface 91i is substantially parallel to the axial direction. The surface 91i forms a cylindrical surface as a whole. A distance between the surface 91i and the axial center L1 (not illustrated in FIG. 4) is shorter than that between the outer circumferential surface 91s and the axial center L1.

The surface 91j forms a portion farthest from the axial center L1 out of the end surfaces facing the axial center portion of the projection 91c. The surface 91j is formed continuously with the surface 91i on the inner side of the surface 91i. In addition, the surface 91j is continuous with the surface 91d where the first outer ring member 91 is in contact with the second outer ring member 92. The surface 91j is inclined with respect to the axial direction. Further, the surface 91j is also inclined with respect to the radial direction. The surface 91j forms a surface, which has a truncated cone shape in side view whose diameter increases from the inner side to the outer side, as a whole.

Polishing is not performed on the surface 91i and the surface 91j forming the projection 91c of the first outer ring member 91. That is, a polishing surface is not included in the surface 91i and the surface 91j forming the projection 91c of the first outer ring member 91.

(Second Outer Ring Member)

Figure 5:
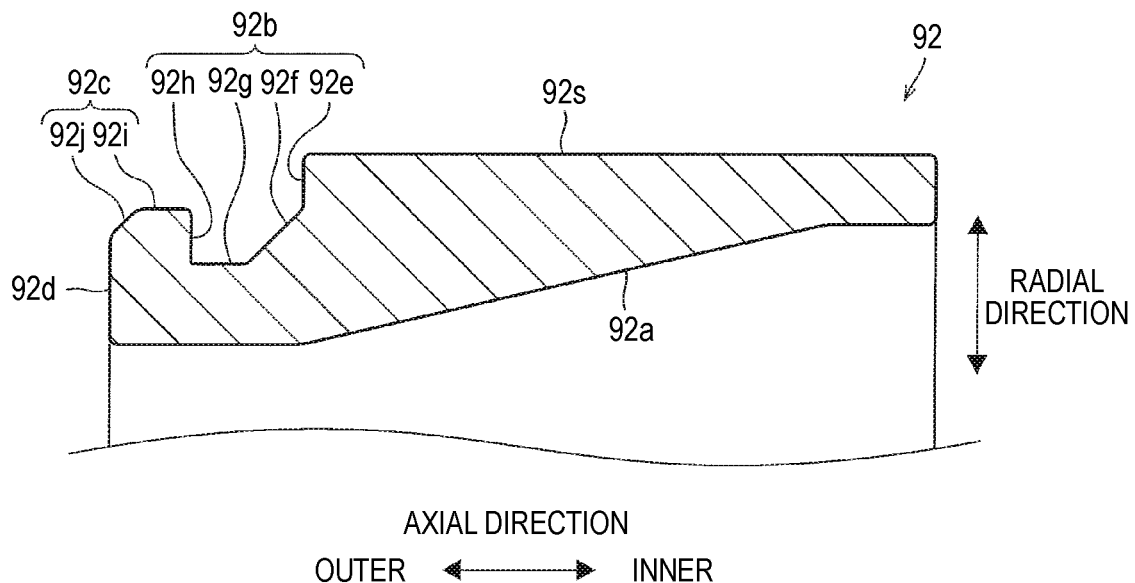
FIG. 5 is a cross-sectional view of a second outer ring member according to the first embodiment.

FIG. 5 is a cross-sectional view of the second outer ring member 92. A groove 92b is formed on the outer side of the outer circumferential surface 92s of the second outer ring member 92. The groove 92b extends annularly in a circumferential direction. The groove 92b is formed in the axial direction with a distance of about 0.2 to 2 cm from the surface 92d where the second outer ring member 92 is in contact with the first outer ring member 91.

The outer side of the second outer ring member 92 is provided with a projection 92c rather than the groove 92b. The projection 92c protrudes outward in the radial direction from the groove 92b.

The groove 92b includes a surface 92e, a surface 92f, a surface 92g, and a surface 92h. In addition, the projection 92c includes a surface 92i and a surface 92j. The surface 92i and the surface 92j of the projection 92c form an end surface facing an axial center portion.

The surface 92e is continuous with the outer circumferential surface 92s. The surface 92e is an annular surface that is substantially parallel to the radial direction.

The surface 92f is formed continuously with the surface 92e on the outer side of the surface 92e. The surface 92f is inclined with respect to the axial direction. Further, the surface 92f is also inclined with respect to the radial direction. The surface 92f forms a surface, which has a truncated cone shape in side view whose diameter increases from the outer side to the inner side, as a whole.

The surface 92g is formed continuously with the surface 92f on the outer side of the surface 92f. The surface 92g is substantially parallel to the axial direction. The surface 92g forms a cylindrical surface as a whole.

The surface 92h is formed continuously with the surface 92g on the outer side of the surface 92g. The surface 92h is continuous with the projection 92c. The surface 92h is an annular surface that is substantially parallel to the radial direction. The surface 92h is engaged with the surface 15a of the coupling ring 13.

The surface 92i is continuous with the surface 92h of the groove 92b. The surface 92i is substantially parallel to the axial direction. The surface 92i forms a cylindrical surface as a whole. The surface 92i is closer to the axial center L1 (not illustrated in FIG. 5) than the outer circumferential surface 92s.

The surface 92j forms a portion farthest from the axial center L1 out of the end surfaces facing the axial center portion of the projection 92c. The surface 92j is formed continuously with the surface 92i on the outer side of the surface 92i. In addition, the surface 92j is continuous with the surface 92d where the second outer ring member 92 is in contact with the first outer ring member 91. The surface 92j is inclined with respect to the axial direction. Further, the surface 92j is also inclined with respect to the radial direction. The surface 92j forms a surface, which has a truncated cone shape in side view whose diameter increases from the outer side to the inner side, as a whole.

Polishing is not performed on the surface 92i and the surface 92j forming the projection 92c of the second outer ring member 92. That is, a polishing surface is not included in the surface 92i and the surface 92j forming the projection 92c of the second outer ring member 92.

Each of the first outer ring member 91 and the second outer ring member 92 is formed by forging and lathe turning. After forming, polishing is performed on the raceway surfaces 91a and 92a of the first outer ring member 91 and the second outer ring member 92. At this time, the polishing is not performed on the surfaces 91i and 91j forming the projection 91c of the first outer ring member 91 and the surfaces 92i and 92j forming the projection 92c of the second outer ring member 92.

Figure 6:
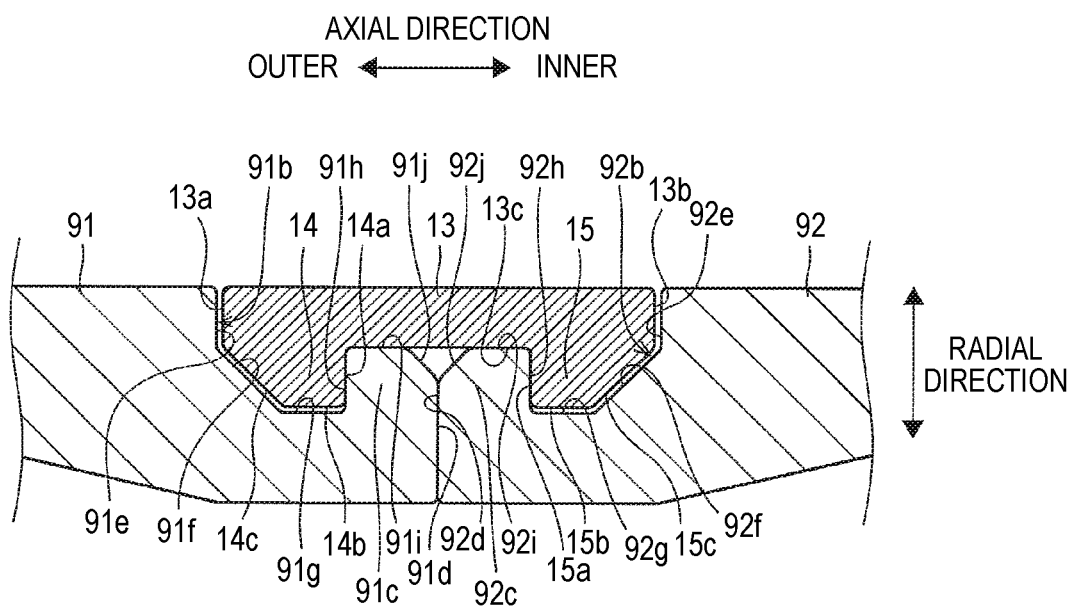
FIG. 6 is a cross-sectional view illustrating a part of the outer ring and the coupling ring according to the first embodiment.

Hereinafter, the description will be made in detail with respect to the structure of the portion in which the first outer ring member 91 and the second outer ring member 92 are fixed to each other by the coupling ring 13. FIG. 6 is a cross-sectional view illustrating a state where the first outer ring member 91, the second outer ring member 92, and the coupling ring 13 are fitted together.

In the state where the first outer ring member 91, the second outer ring member 92, and the coupling ring 13 are fitted, as illustrated in FIG. 6, the claw 14 of the coupling ring 13 is fitted into the groove 91b, and the claw 15 is fitted into the groove 92b. At this time, the surface 14a of the claw 14 faces the surface 91h of the first outer ring member 91, and the surface 15a of the claw 15 faces the surface 92h of the second outer ring member 92 at the same time. Then, the projections 91c and 92c are fitted into the space formed between the claw 14 and the claw 15 in the axial direction. Thus, a relative movement between the first outer ring member 91 and the second outer ring member 92 in the axial direction is restricted.

The structure illustrated in FIG. 6 will be described in detail. The surface 91e of the first outer ring member 91 faces the surface 13a of the coupling ring 13. The surface 91i faces the inner circumferential surface 13c of the coupling ring 13. In the groove 91b, the surface 91f faces the surface 14c of the claw 14. The surface 91g faces the surface 14b of the claw 14. The surface 91h faces the surface 14a of the claw 14.

Further, the surface 92e of the first outer ring member 92 faces the surface 13b of the coupling ring 13. The surface 92i faces the inner circumferential surface 13c of the coupling ring 13. In the groove 92b, the surface 92f faces the surface 15c of the claw 15. The surface 92g faces the surface 15b of the claw 15. The surface 92h faces the surface 15a of the claw 15.

In addition, a space is formed between the surface 91j of the first outer ring member 91, the surface 92j of the second outer ring member 92, and the inner circumferential surface 13c of the coupling ring 13.

An outer diameter of the surface 91i is slightly larger than an inner diameter of the surface 13c. That is, the pair of surfaces 91i and 13c facing each other are designed to be fitted in an interference-fit manner. On the other hand, the facing surfaces 91e and 13a, the facing surfaces 91f and 14c, the facing surfaces 91g and 14b, and the facing surfaces 91h and 14a are designed to be fitted in a clearance-fit manner.

Further, an outer diameter of the surface 92i is slightly larger than an inner diameter of the surface 13c. That is, the pair of surfaces 92i and 13c facing each other are designed to be fitted in an interference-fit manner. On the other hand, the facing surfaces 92e and 13b, the facing surfaces 92f and 15c, the facing surfaces 92g and 15b, and the facing surfaces 92h and 15a are designed to be fitted in a clearance-fit manner.

It is not an indispensable configuration of the present invention that the pair of facing surfaces 91i and 13c and the pair of facing surfaces 92i and 13c are designed to be fitted in the interference-fit manner. For example, the pair of facing surfaces 91i and 13c and the pair of facing surfaces 92i and 13c may be designed to be fitted in the clearance-fit manner. Even in this case, as long as the first outer ring member 91 and the second outer ring member 92 respectively include the groove 91b and the groove 92b on the outer circumferential surface, the first outer ring member 91 and the second outer ring member 92 are fixed to each other by the coupling ring 13 without polishing the portion, which is fitted with the coupling ring, of the outer circumferential surface of the first outer ring member 91 and the second outer ring member 92.

The coupling ring 13 can be attached to the outer circumferential surfaces 91s and 92s of the first outer ring member 91 and the second outer ring member 92 in a press-fit manner. Thus, the relative movement between the first outer ring member 91 and the second outer ring member 92 in the axial direction is restricted.

Effects of First Embodiment

In the case of fixing the inner circumferential surfaces of the outer ring members to each other with the coupling ring like the bearing device disclosed in Patent Literature 1 (DE 102010017964A1; Description), it is necessary to press-fit the coupling ring into the outer ring members, a high degree of accuracy is required for the dimension of the inner diameter of the outer ring member and the dimension of the outer circumferential surface of the coupling ring, and thus it is necessary to polish the portion, which is fitted with the coupling ring, of the outer ring member. Therefore, the portion, which is fitted with the coupling ring, of the outer ring member outer ring includes the polishing surface.

However, according to the tapered roller bearing 3 of the first embodiment, the first outer ring member 91 and the second outer ring member 92 include the groove 91b and the groove 92b on the outer circumferential surfaces, respectively, the coupling ring 13 includes the claws 14 and 15 corresponding to the groove 91b and the groove 92b, and the groove 91b and the groove 92b are fitted into the claws 14 and 15, respectively, whereby the first outer ring member 91 and the second outer ring member 92 can be fixed.

Since the claws 14 and 15 of the coupling ring 13 may be fixed to the grooves 91b and 92b in an interference-fit manner, or may be fixed to the grooves 91b and 92b in a clearance-fit manner, the portion fitting with the coupling ring 13 is not required to be machined with high accuracy and the polishing of the projections 91c and 92c is not necessary. Accordingly, the projections 91c and 92c of the first outer ring member 91 and the second outer ring member 92 can be configured not to include the polishing surface.

In the tapered roller bearing 3 of the first embodiment, the outer side of the claw 14 of the coupling ring 13 includes the surface 14c inclined in both the radial direction and the axial direction. Therefore, the coupling ring 13 can be inserted into the first outer ring member 91 with a small force compared with a case where the claw 14 does not include the surface 14c. Since the claw includes the surface 14c inclined in both the radial direction and the axial direction, the corner portion on the outer side of the claw 14 is prevented from being in contact with the surface of the first outer ring member 91.

Similarly, the inner side of the claw 15 of the coupling ring 13 includes the surface 15c inclined in both the radial direction and the axial direction. Therefore, the coupling ring 13 can be inserted into the second outer ring member 92 with a small force compared with a case where the claw 15 does not include the surface 15c. Since the claw 15 includes the surface 15c inclined in both the radial direction and the axial direction, the corner portion on the inner side of the claw 15 is prevented from being in contact with the surface of the second outer ring member 92.

In addition, the corner portion on the inner side of the projection 91c of the first outer ring member 91 includes the surface 91j inclined in both the radial direction and the axial direction. Therefore, the coupling ring 13 can be inserted into the first outer ring member 91 with a small force compared with a case where the first outer ring member 91 does not include the surface 91j. Since the projection 91c includes the surface 91j inclined in both the radial direction and the axial direction, the corner portion on the inner side of the projection 91c is prevented from being in contact with the inner circumferential surface 13c of the coupling ring 13.

Similarly, the corner portion on the outer side of the projection 92c of the second outer ring member 92 includes the surface 92j inclined in both the radial direction and the axial direction. Therefore, the coupling ring 13 can be inserted into the second outer ring member 92 with a small force compared with a case where the second outer ring member 92 does not include the surface 92j. Since the projection 92c includes the surface 92j inclined in both the radial direction and the axial direction, the corner portion on the outer side of the projection 92c is prevented from being in contact with the inner circumferential surface 13c of the coupling ring 13.

As described above, the corner portion on the outer side of the claw 14 or the corner portion on the inner side of the claw 15 is prevented from being in contact with the first outer ring member 91 and the second outer ring member 92, or the corner portion on the inner side of the projection 91c or the corner portion on the outer side of the projection 92c is prevented from being in contact with the inner circumferential surface 13c of the coupling ring 13. For this reason, the resin of the coupling ring 13 is scraped, and thus it is prevented that residues remain in the tapered roller bearing 3 or the resin forming the coupling ring 13 deteriorates due to a large force.

Other Embodiments

Figure 7:
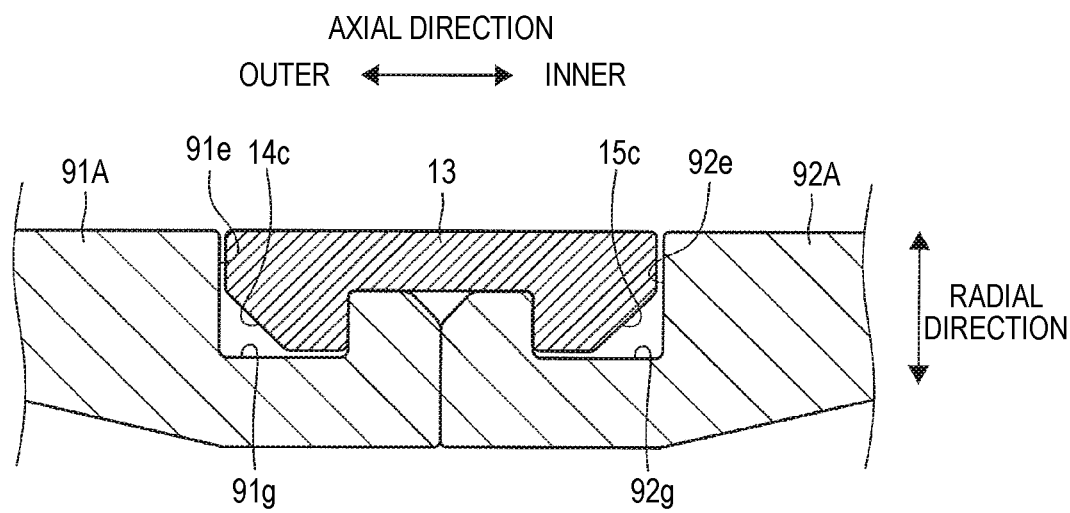
FIG. 7 is a cross-sectional view illustrating a part of an outer ring and a coupling ring according to a modified example.

In the first embodiment, the surface forming the groove 91b of the first outer ring member 91 includes the surface 91f inclined in both the axial direction and the radial direction, but as illustrated in FIG. 7, the surface 91f is not an essential configuration. Similarly, the surface forming the groove 92b of the second outer ring member 92 includes the surface 92f inclined in both axial direction and the radial direction, but as illustrated in FIG. 7, the surface 92f is not an essential configuration. In this case, an annular space is formed between the surface 91e, the surface 91g, and the surface 14c. Even in this case, the same effect as in the first embodiment can be obtained.

The configuration has been described in the first embodiment in which (1) the outer side of the claw 14 includes the surface 14c inclined in both the radial direction and the axial direction, the inner side of the claw 15 includes the surface 15c inclined in both the radial direction and the axial direction, (2) the corner portion on the inner side of the projection 91c includes the surface 91j inclined in both the radial direction and the axial direction, and the corner portion on the outer side of the projection 92c includes the surface 92j inclined in both the radial direction and the axial direction. However, according to the present invention, it is possible to solve the problem of the present invention by either (1) or (2).

Figure 8:
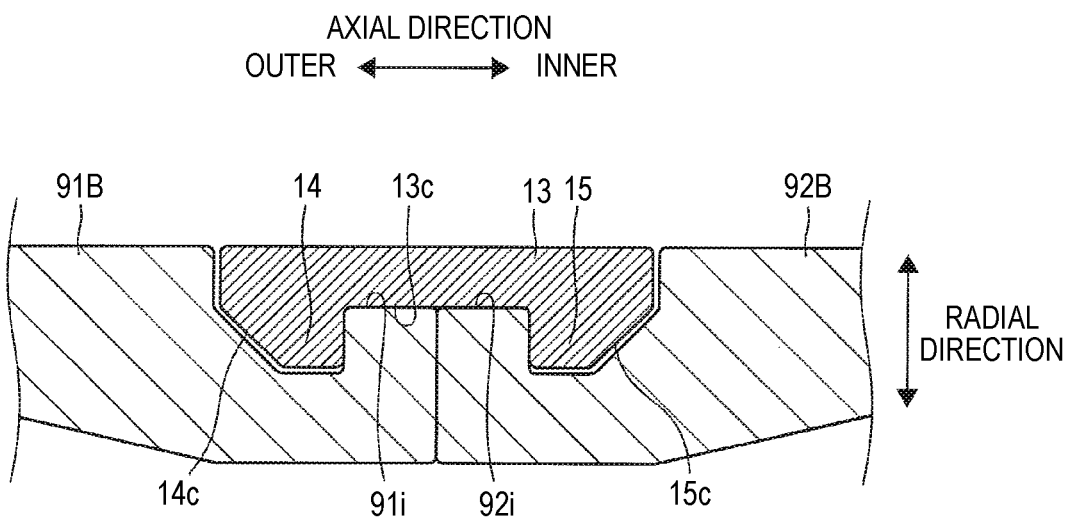
FIG. 8 is a cross-sectional view illustrating a part of the outer ring and the coupling ring according to the modified example.

For example, as illustrated in FIG. 8, the outer side of the claw 14 includes the surface 14c inclined in both the radial direction and the axial direction and the inner side of the claw 15 includes the surface 15c inclined in both the radial direction and the axial direction, whereas the projections 91c and 92c may not include an inclined surface.

Figure 9:
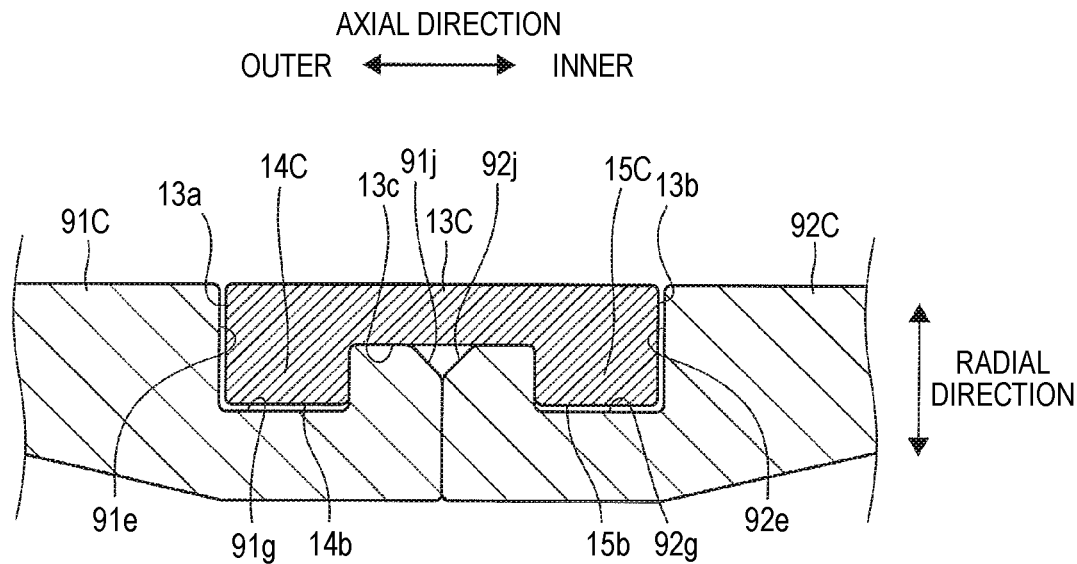
FIG. 9 is a cross-sectional view illustrating a part of the outer ring and the coupling ring according to the modified example.

Further, as illustrated in FIG. 9, the corner portion on the inner side of the projection 91c includes the surface 91j inclined in both the radial direction and the axial direction and the corner portion on the outer side of the projection 92c includes the surface 92j inclined in both the radial direction and the axial direction, whereas the claws 14 and 15 may not include an inclined surface.

As described in the first embodiment and the modified example, it is not indispensable that the first outer ring member 91 and the second outer ring member 92 include the inclined surfaces. As long as the first outer ring member 91 and the second outer ring member 92 respectively include the groove 91b and the groove 92b on the outer circumferential surfaces thereof, it is possible to fix the first outer ring member 91 and the second outer ring member 92 with the coupling ring 13 without polishing the outer circumferential surfaces of the first outer ring member 91 and the second outer ring member 92.

Figure 10:
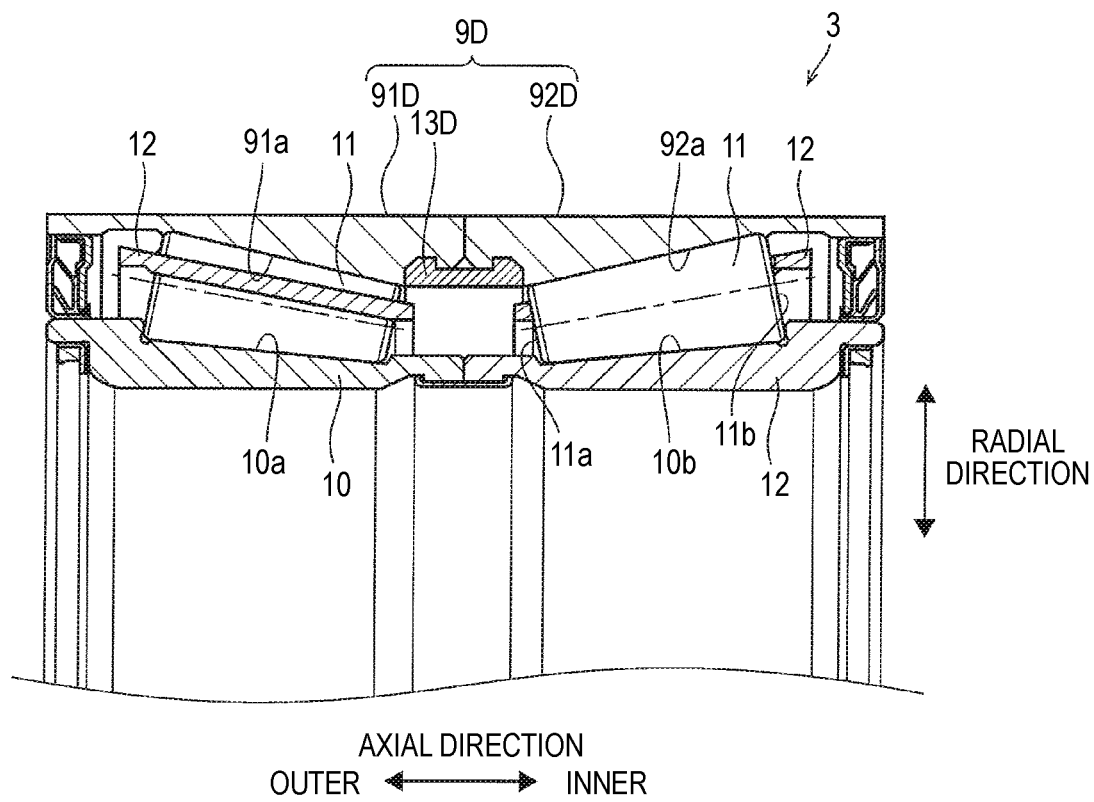
FIG. 10 is a cross-sectional view illustrating a tapered roller bearing according to the modified example.

The case is described in the present embodiment in which the coupling ring 13 coupling the first outer ring member 91 and the second outer ring member 92 is fitted to the outer circumferential surface of the outer ring 9, but as in an outer ring 9D illustrated in FIG. 10, a first outer ring member 91D and a second outer ring member 92D may be fixed to each other at an inner circumferential surface by a coupling ring 13D. In the coupling portion of the first outer ring member 91D, the second outer ring member 92D, and the coupling ring 13D, the respective structures are the same as those of the first embodiment or the modified example described above except that the upper and lower sides are reversed.

Figure 11:
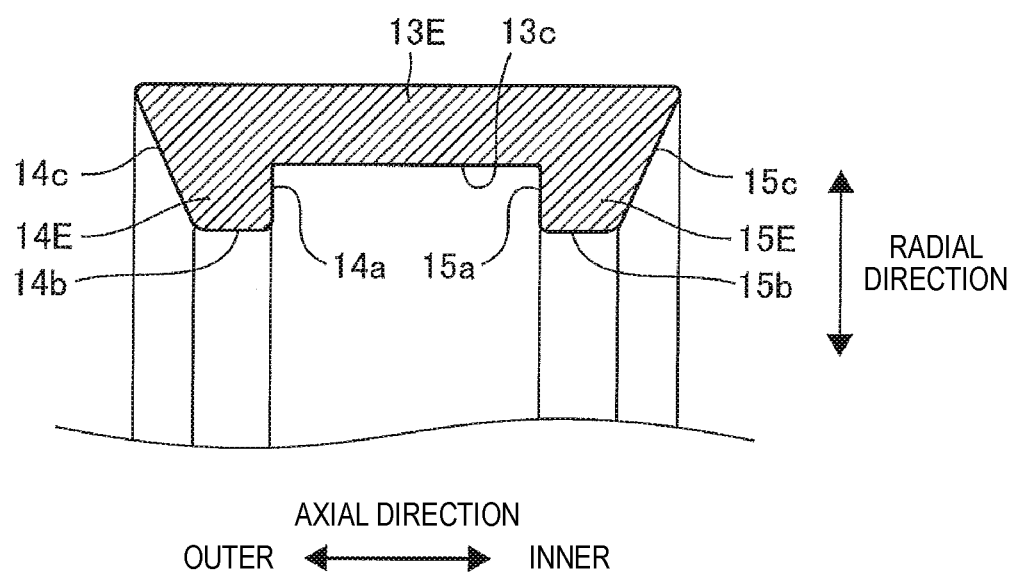
FIG. 11 is a cross-sectional view of the coupling ring according to the modified example.
Figure 12:
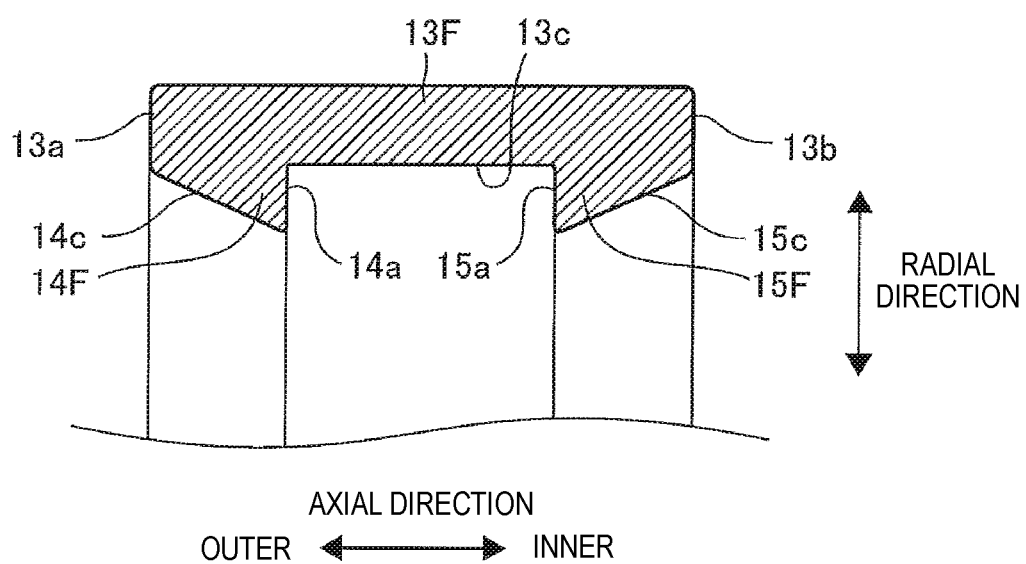
FIG. 12 is a cross-sectional view of the coupling ring according to the modified example.

A modified example of the structure of the coupling ring 13 will be described below. FIGS. 11 and 12 are cross-sectional views illustrating coupling rings 13E and 13F according to the modified example.

The coupling ring 13 may not include the surfaces 13a and 13b substantially parallel to each other in the radial direction at the end surfaces on the outer side and the inner side. For example, as illustrated in FIG. 11, all the end surfaces on the outer side of the coupling ring 13E are formed with a surface 14c inclined in both the axial direction and the radial direction. Similarly, all the end surfaces on the inner side of the coupling ring 13E are formed with a surface 15c inclined in both the axial direction and the radial direction.

In addition, the claws 14 and 15 of the coupling ring 13 may not include the surfaces 14b and 15b substantially parallel to each other in the axial direction. For example, as illustrated in FIG. 12, a claw 14F of the coupling ring 13F includes only the surface 14a and the surface 14c. Similarly, a claw 15F includes only the surface 15a and the surface 15c.

In the end surface of the claw 14 which faces outwards in the axial direction, at least a portion closest to the axial center in the radial direction may be a surface inclined in the axial direction and the radial direction. For example, the end surface, which faces outwards in the axial direction, of the claw 14 may be include the inclined surface 14c and a surface continuous outward of the surface 14c in the radial direction and parallel to the radial direction. This is also applied to the claw 15.

Figure 13:
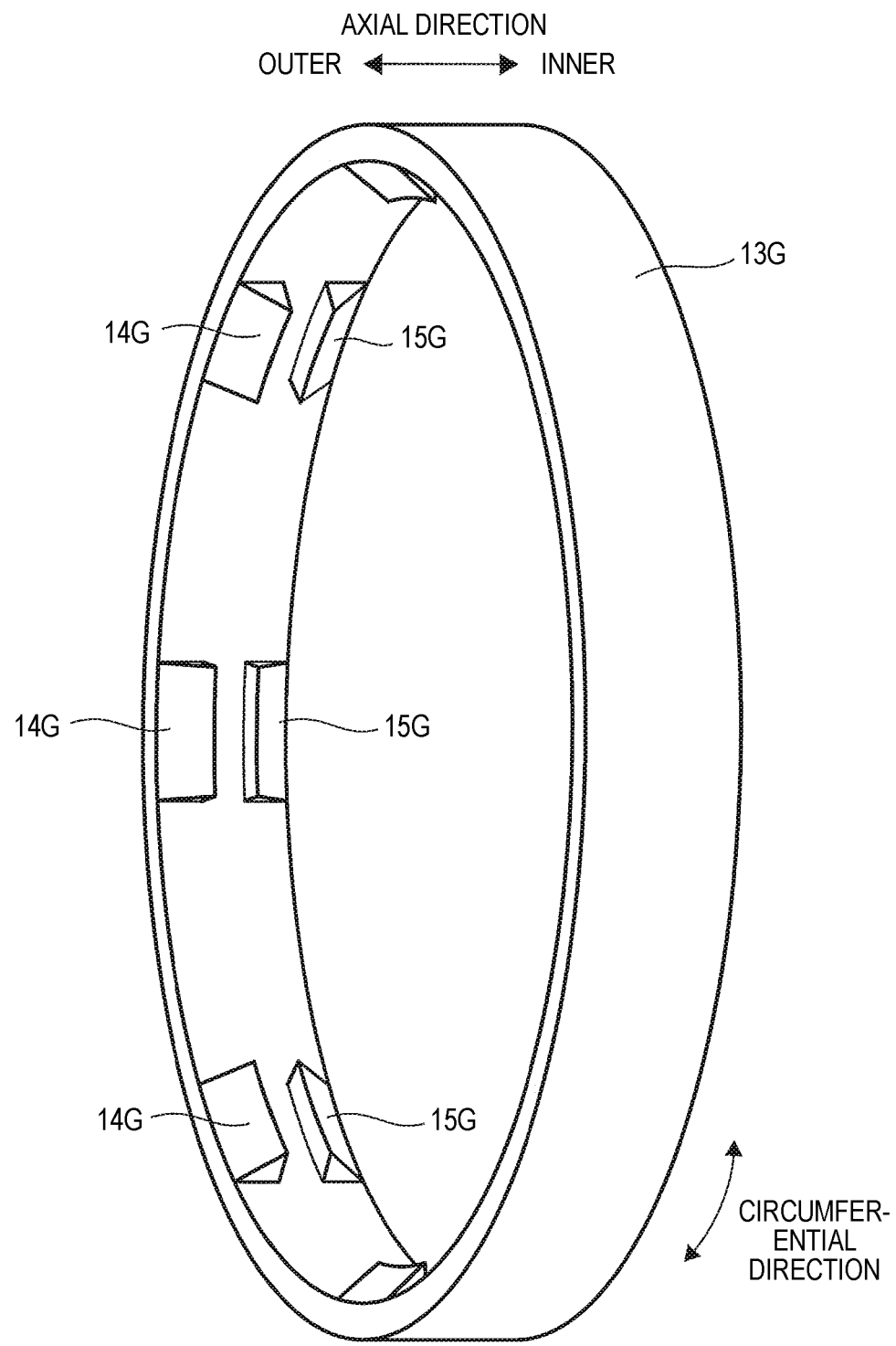
FIG. 13 is a perspective view of the coupling ring according to the modified example.

The case is described in the embodiment described above in which the annular claws 14 and 15 are formed on the inner circumferential surface of the coupling ring 13, but the shape of the claws 14 and 15 is not limited thereto. For example, as illustrated in FIG. 13, a plurality of claws 14G and 15G in a coupling ring 13G may be formed to be spaced apart from each other in the circumferential direction. In this case, the claws 14G and 15G are formed discontinuously in the circumferential direction, and thus a press-fit force can be reduced when the coupling ring is fitted into first outer ring member 91 and the second outer ring member 92.

Figure 14:
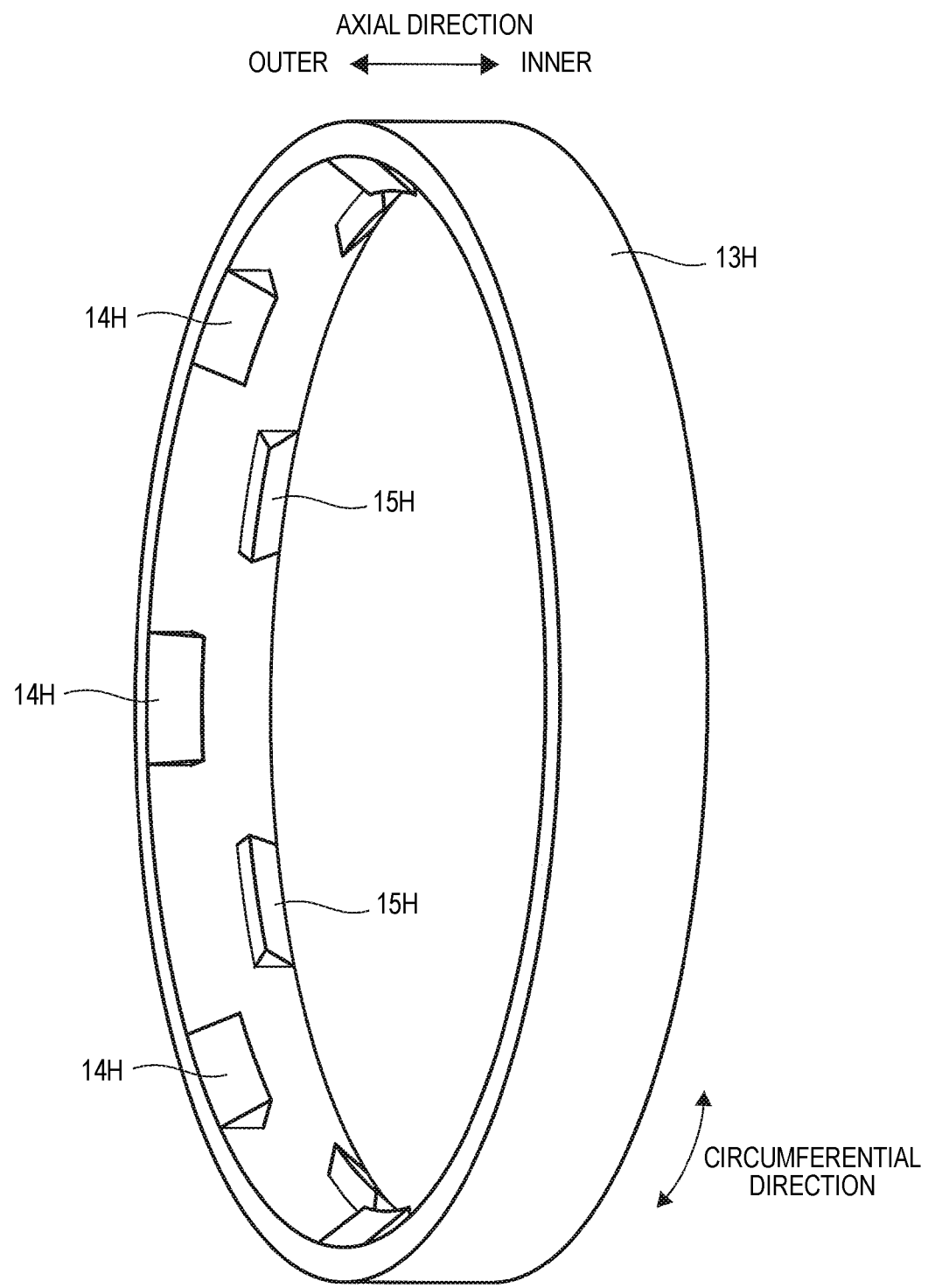
FIG. 14 is a perspective view of the coupling ring according to the modified example.

Further, as illustrated in FIG. 14, a plurality of claws 14H and 15H formed to be spaced apart from each other in the circumferential direction in a coupling ring 13H may be disposed so as not to overlap with each other when viewed in the axial direction. In the case of injection-molding the coupling ring 13H illustrated in FIG. 14, there is no need to perform a process of removing a resin filled between the claws 14H and 15H in the axial direction. Therefore, the coupling ring 13H can be manufactured with high yield.

Figure 15:
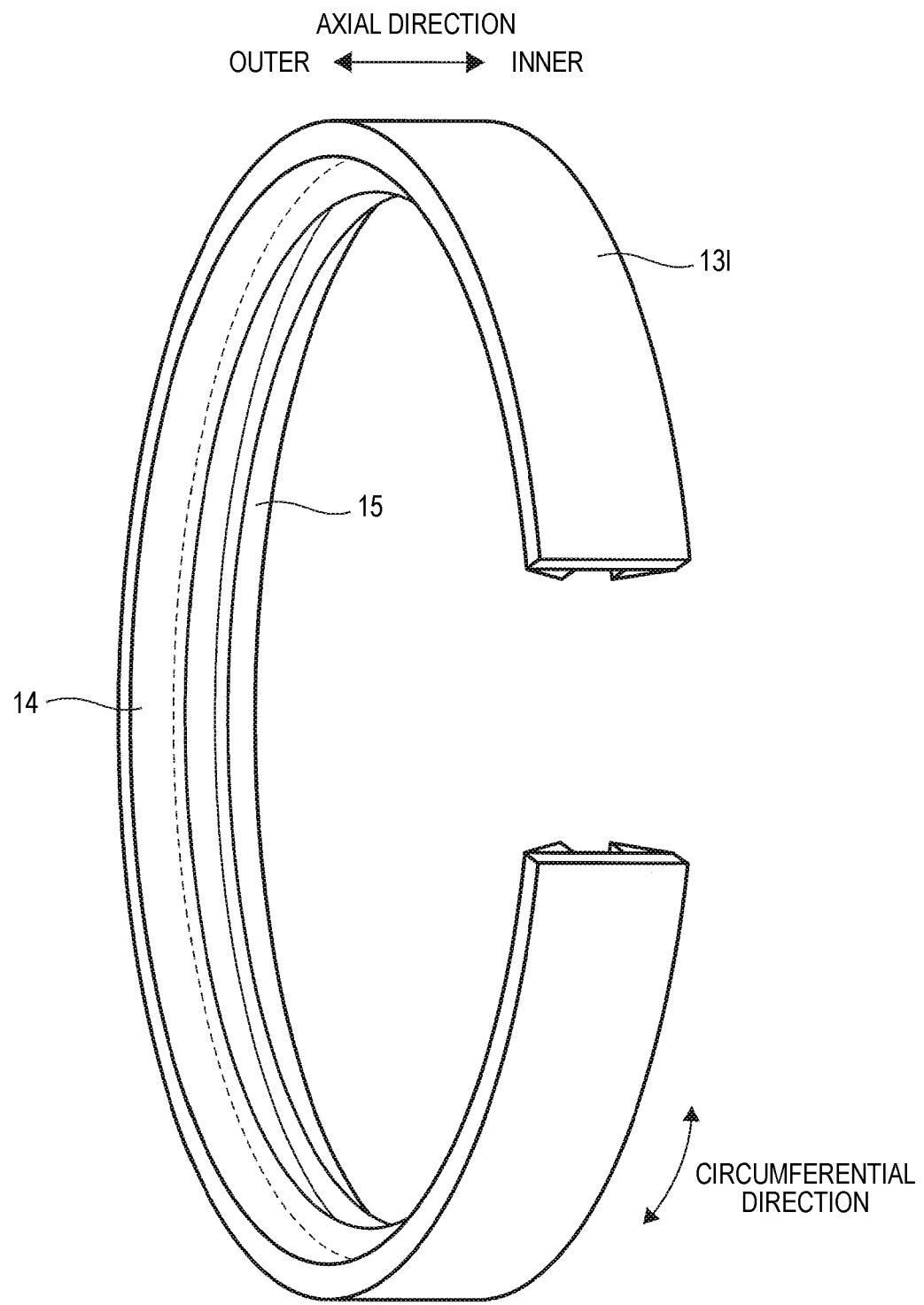
FIG. 15 is a perspective view of the coupling ring according to the modified example.
Figure 16:
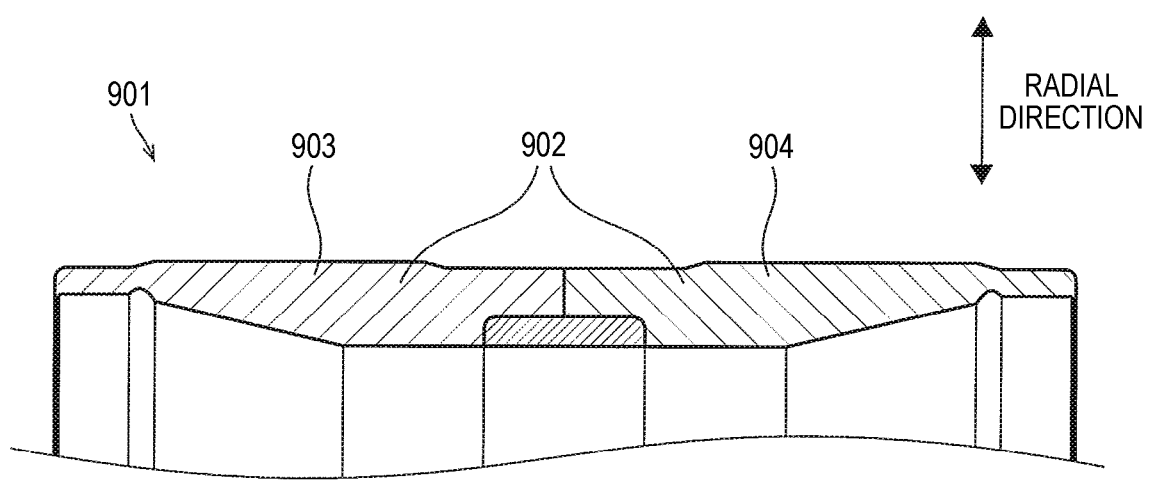
FIG. 16 is a cross-sectional view illustrating an outer ring component member and a coupling ring in a tapered roller bearing according to a conventional example.

In the embodiment described above, the coupling ring 13 is configured in the endless ring shape, but may be configured in other shapes. For example, as illustrated in FIG. 15, a part of a coupling ring 13I may have a ring-opening shape.

In the first and second embodiments described above, the bottom 11a of the rolling element 11 closer to the center portion in the axial direction is disposed closer to the axial center L1 in the radial direction than the bottom 11b closer to both ends in the axial direction, but the present invention is not particularly limited thereto. The bottom 11a of the rolling element 11 closer to the center portion in the axial direction may be disposed farther from the axial center L1 in the radial direction than the bottom 11b closer to both ends in the axial direction.

In the first and second embodiments described above, the outer side of the hub unit 100 is the first outer ring member 91 of the first outer ring member 91 and the second outer ring member 92, and the inner side is the second outer ring member 92, but this is an example. The hub unit 100 is freely disposed, and the outer side and the inner side may be reversed.

In the first and second embodiments, the tapered roller bearing 3 has been described, but the present invention can also be applied to other types of bearing devices as long as the bearing device has rolling elements arranged in double rows. For example, the present invention may be applied to the bearing device in which the rolling element is a ball rolling element.

All of the above-described embodiments are strictly intended to clarify the technical contents of the present invention. The present invention should not be interpreted as being limited to such specific examples, but should be broadly interpreted, and various modifications of the invention can be made within the spirit and scope of the invention as set forth in the appended claims.

This application is based upon and claims the benefit of priority from Japanese Patent Application No. 2015-2253053, filed Dec. 25, 2015, the entire contents of which are incorporated herein by reference.

REFERENCE SIGNS LIST

3: Tapered roller bearing (bearing device)
9: Outer ring
91: First outer ring member
91a: Raceway surface
91b: Groove (first groove)
91c: Projection (first projection)
91j: Inclined surface
92: Second outer ring member
92a: Raceway surface
92b: Groove (second groove)
92c: Projection (second projection)
92j: Inclined surface
10: Inner ring
10a: Raceway surface
11: Plurality of rolling elements
13: Coupling ring
14: Claw (first claw)
14c: Inclined surface
15: Claw (second claw)
15c: Inclined surface

The invention claimed is:

1. A bearing device comprising:
a first outer ring member and a second outer ring member which include a raceway surface in each inner circumferential surface and are disposed to abut on each other in an axial direction, a surface finish of the raceway surface in each inner circumferential surface being a polished finish;
a coupling ring which fixes the first outer ring member and the second outer ring member to each other;
an inner ring in which two rows of raceway surfaces are formed in an outer circumferential surface; and
a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring, wherein the first outer ring member includes
  a first groove extending in a circumferential direction in an outer circumferential surface, and
  a first projection which is annularly formed to protrude outwards in a radial direction at a position closer to the second outer ring member than the first groove, wherein the second outer ring member includes
  a second groove extending in the circumferential direction in an outer circumferential surface, and
  a second projection which is annularly formed to protrude outwards in the radial direction at a position closer to the first outer ring member than the second groove, wherein the coupling ring includes
  a first claw protruding toward the first groove, and
  a second claw protruding toward the second groove, and wherein a surface forming the first projection of the first outer ring member includes a first surface adjacent an interface of the first outer ring member and the second outer ring member, the first surface being configured to be out of contact with the coupling ring, and a second surface extending from the first surface in a direction away from the interface, the second surface being configured to contact the coupling ring, wherein a surface forming the second projection of the second outer ring member includes a first surface adjacent the interface, the first surface being configured to be out of contact with the coupling ring, and a second surface extending from the first surface in a direction away from the interface, the second surface being configured to contact the coupling ring, wherein the first projection includes end surfaces facing a center portion of the bearing device in the axial direction, and the end surfaces of the first projection include the first surface of the first projection, which is an inclined surface whose diameter becomes larger from the center portion toward an outer side of the bearing device in the axial direction, at a portion which is farthest from an axis of the first outer ring member in the radial direction, wherein the second projection includes end surfaces facing the center portion of the bearing device in the axial direction, and the end surfaces of the second projection include the first surface of the second projection, which is an inclined surface whose diameter becomes larger from the center portion toward the outer side in the axial direction, at a portion which is farthest from an axis of the second outer ring member in the radial direction, wherein the surface forming the first projection of the first outer ring member includes a third surface extending radially inward from the second surface of the first projection, the third surface of the first projection being configured to engage a radial surface of the first claw in a clearance fit manner, and wherein the surface forming the second projection of the second outer ring member includes a third surface extending radially inward from the second surface of the second projection, the third surface of the second projection being configured to engage a radial surface of the second claw in a clearance fit manner.

2. The bearing device according to claim 1, further comprising:
  clearances between an inner circumferential surface of the coupling ring and an outer circumferential surface of the first projection and between the inner circumferential surface of the coupling ring and an outer circumferential surface of the second projection,
  wherein a first portion of the coupling ring, which is closest to an axis of the coupling ring in the radial direction, of end surfaces facing an outer side in the axial direction of the coupling ring (1) at least partially forms the first claw and (2) is an inclined surface whose diameter becomes larger from a center portion toward the outer side in the axial direction, and
  wherein a second portion of the coupling ring, which is closest to the axis in the radial direction, of end surfaces facing an outer side in the axial direction of the coupling ring (1) at least partially forms the second claw and (2) is an inclined surface whose diameter becomes larger from the center portion toward the outer side in the axial direction.

3. The bearing device according to claim 2, wherein the first claw and the second claw are a plurality of claws formed to be spaced apart from each other in the circumferential direction in the coupling ring.

4. The bearing device according to claim 1,
  wherein a distance in the radial direction between the inner circumferential surface of the coupling ring and the surface of the first projection facing the outer side in the radial direction is smaller than a thickness of a clearance formed between the first groove and the first claw, and
  wherein a distance in the radial direction between the inner circumferential surface of the coupling ring and the surface of the second projection facing the outer side in the radial direction is smaller than a thickness of a clearance formed between the second groove and the second claw.

5. The bearing device according to claim 1, wherein the first claw and the second claw are aligned with one another in the axial direction.

6. The bearing device according to claim 1, wherein each of the first surface and the second surface of the first projection and each of the first surface and the second surface of the second projection have a surface finish that is different than the surface finish of the raceway surface of each inner circumferential surface.

7. A bearing device comprising:
  a first outer ring member and a second outer ring member which include a raceway surface in each inner circumferential surface and are disposed to abut on each other in an axial direction, a surface finish of the raceway surface in each inner circumferential surface being a polished finish;
  a coupling ring which fixes the first outer ring member and the second outer ring member to each other;
  an inner ring in which two rows of raceway surfaces are formed in an outer circumferential surface; and
  a plurality of rolling elements which are disposed in a space formed between the raceway surface of the first outer ring member and one of the two rows of the raceway surfaces of the inner ring, and in a space formed between the raceway surface of the second outer ring member and the other one of the two rows of the raceway surfaces of the inner ring, wherein the first outer ring member includes
a first groove extending in a circumferential direction in an outer circumferential surface, and
a first projection which is annularly formed to protrude outwards in a radial direction at a position closer to the second outer ring member than the first groove,
wherein the second outer ring member includes
a second groove extending in the circumferential direction in an outer circumferential surface, and
a second projection which is annularly formed to protrude outwards in the radial direction at a position closer to the first outer ring member than the second groove,
wherein the coupling ring includes
a first claw protruding toward the first groove, and
a second claw protruding toward the second groove, and
wherein a surface forming the first projection of the first outer ring member includes a first surface adjacent an interface of the first outer ring member and the second outer ring member, the first surface being configured to be out of contact with the coupling ring, and a second surface extending from the first surface in a direction away from the interface, the second surface being configured to contact the coupling ring,
wherein a surface forming the second projection of the second outer ring member includes a first surface adjacent the interface, the first surface being configured to be out of contact with the coupling ring, and a second surface extending from the first surface in a direction away from the interface, the second surface being configured to contact the coupling ring,
wherein a distance in the radial direction between the inner circumferential surface of the coupling ring and the surface of the first projection facing the outer side in the radial direction is smaller than a thickness of a clearance formed between the first groove and the first claw,
wherein a distance in the radial direction between the inner circumferential surface of the coupling ring and the surface of the second projection facing the outer side in the radial direction is smaller than a thickness of a clearance formed between the second groove and the second claw,
wherein the surface forming the first projection of the first outer ring member includes a third surface extending radially inward from the second surface of the first projection, the third surface of the first projection being configured to engage a radial surface of the first claw in a clearance fit manner, and
wherein the surface forming the second projection of the second outer ring member includes a third surface extending radially inward from the second surface of the second projection, the third surface of the second projection being configured to engage a radial surface of the second claw in a clearance fit manner.

8. The bearing device according to claim 7, further comprising:
clearances between an inner circumferential surface of the coupling ring and an outer circumferential surface of the first projection and between the inner circumferential surface of the coupling ring and an outer circumferential surface of the second projection,
wherein a first portion of the coupling ring, which is closest to an axis of the coupling ring in the radial direction, of end surfaces facing an outer side in the axial direction of the coupling ring (1) at least partially forms the first claw and (2) is an inclined surface whose diameter becomes larger from a center portion toward the outer side in the axial direction, and
wherein a second portion of the coupling ring, which is closest to the axis in the radial direction, of end surfaces facing an outer side in the axial direction of the coupling ring (1) at least partially forms the second claw and (2) is an inclined surface whose diameter becomes larger from the center portion toward the outer side in the axial direction.

9. The bearing device according to claim 8, wherein the first claw and the second claw are a plurality of claws formed to be spaced apart from each other in the circumferential direction in the coupling ring.

10. The bearing device according to claim 7, wherein the first claw and the second claw are aligned with one another in the axial direction.

11. The bearing device according to claim 7, wherein each of the first surface and the second surface of the first projection and each of the first surface and the second surface of the second projection have a surface finish that is different than the surface finish of the raceway surface of each inner circumferential surface.

* * * * *